(12) United States Patent
Valentini

(10) Patent No.: US 11,325,784 B2
(45) Date of Patent: May 10, 2022

(54) HIGH PRECISION ROLLER CONVEYOR

(71) Applicant: SYSTEM CERAMICS S.P.A., Fiorano Modenese (IT)

(72) Inventor: Marco Valentini, Casalgrande (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 0 days.

(21) Appl. No.: 17/284,751

(22) PCT Filed: Sep. 26, 2019

(86) PCT No.: PCT/IB2019/058155
§ 371 (c)(1),
(2) Date: Apr. 12, 2021

(87) PCT Pub. No.: WO2020/079506
PCT Pub. Date: Apr. 23, 2020

(65) Prior Publication Data
US 2021/0347573 A1 Nov. 11, 2021

(30) Foreign Application Priority Data
Oct. 18, 2018 (IT) .................. 102018000009572

(51) Int. Cl.
*B65G 13/04* (2006.01)
*B65G 13/07* (2006.01)
(52) U.S. Cl.
CPC ............. *B65G 13/04* (2013.01); *B65G 13/07* (2013.01)

(58) Field of Classification Search
CPC ................................ B65G 13/07; B65G 13/04
See application file for complete search history.

(56) References Cited

U.S. PATENT DOCUMENTS

| | | | | |
|---|---|---|---|---|
| 1,967,747 A | * | 7/1934 | Eggleston | B65G 13/075 198/787 |
| 2,055,053 A | * | 9/1936 | Stokes | B65G 13/07 198/787 |
| 2,609,917 A | * | 9/1952 | Gotthardt | B65G 13/07 198/789 |
| 2,836,284 A | * | 5/1958 | Gilliatt | B65G 13/07 198/787 |
| 3,902,589 A | * | 9/1975 | Bylsma | B65G 13/04 198/790 |
| 4,341,546 A | | 7/1982 | Nitschke et al. | |

(Continued)

FOREIGN PATENT DOCUMENTS

| | | | | |
|---|---|---|---|---|
| CH | 528428 A | * | 9/1972 | ............. B65G 13/07 |
| CN | 206068638 | | 4/2017 | |

(Continued)

*Primary Examiner* — Mark A Deuble
(74) *Attorney, Agent, or Firm* — Pearne & Gordon LLP

(57) ABSTRACT

A roller conveyor, comprising: a plurality of rollers (2) each of which has a cylindrical external surface (21), arranged to enable an object to be transported to rest; a motor (3); a transmission element (4), which kinematically connects the motor (3) to the rollers (2). The transmission element (4) is placed in contact with the external surface (21) of the rollers (2), or in contact with a portion of the rollers (2) which has the same diameter as the external surface (21), and in the same position as the contact point of the external surface with the element to be transported.

5 Claims, 5 Drawing Sheets

(56) References Cited

U.S. PATENT DOCUMENTS

| | | | | |
|---|---|---|---|---|
| 5,040,669 | A | * | 8/1991 | Blocker ................. B65G 13/07 198/782 |
| 5,348,140 | A | * | 9/1994 | Clos ...................... B65G 13/07 198/780 |
| 7,287,640 | B1 | * | 10/2007 | Schmutzler ............ B65G 23/08 193/35 A |
| 9,309,054 | B2 | * | 4/2016 | Scates .................... B65G 13/07 |
| 2015/0041284 | A1 | | 2/2015 | Pfeiffer et al. |

FOREIGN PATENT DOCUMENTS

| | | | |
|---|---|---|---|
| CN | 207329460 | 5/2018 | |
| DE | 102011113353 B3 | 1/2013 | |
| EP | 0013531 A1 * | 7/1980 | ............ B65G 13/07 |
| GN | 205034629 | 2/2016 | |
| JP | 2018030680 A | 3/2018 | |
| KR | 101708860 B1 | 3/2017 | |

* cited by examiner

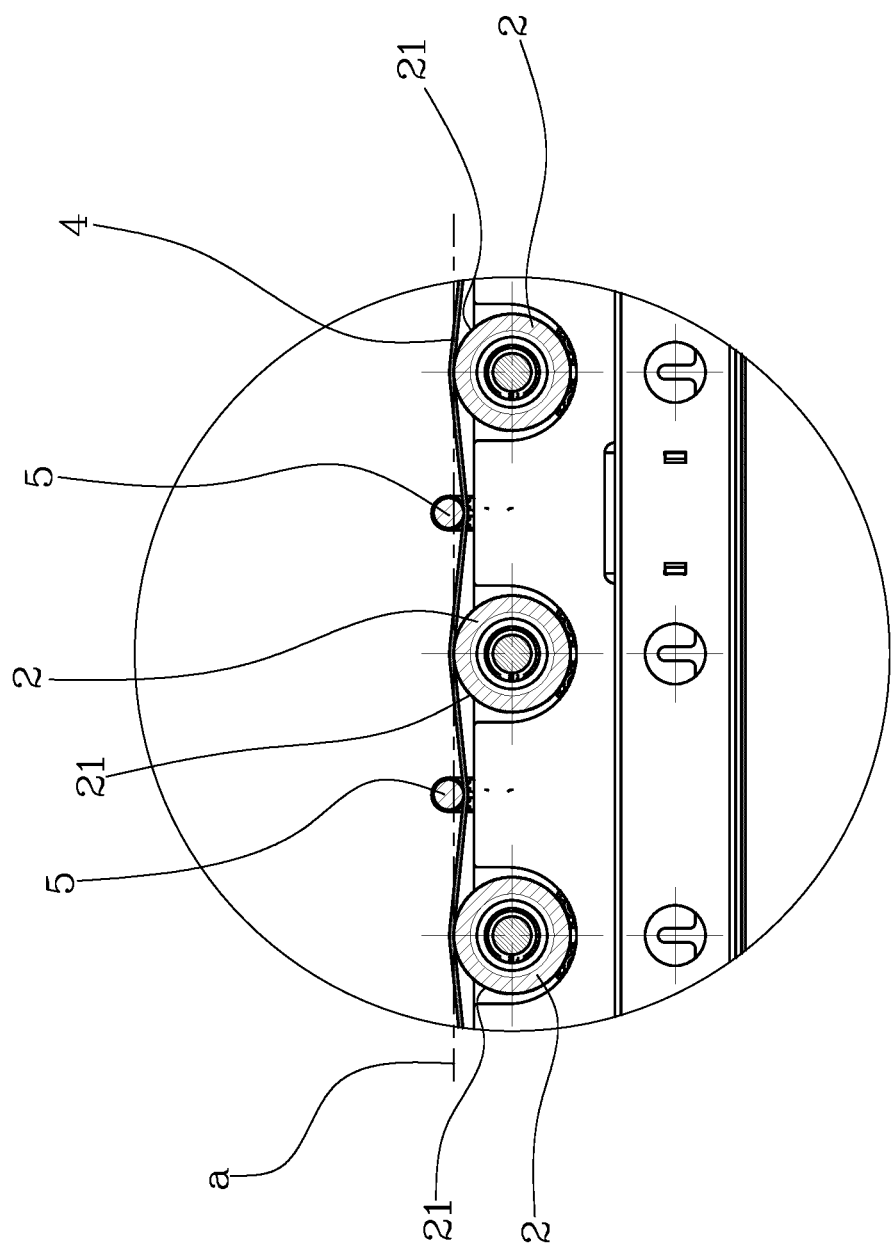

HIGH PRECISION ROLLER CONVEYOR

The present invention relates to a roller conveyor.

The roller conveyor according to the invention is particularly suitable for transporting slabs of glass in an ink jet decorating machine. The roller conveyor according to the invention is however suitable for transporting objects of any type along a predefined advancement direction, and for different purposes from decoration.

Various types of roller conveyors are currently available.

In general, a roller conveyor comprises a plurality of rollers arranged tangential to a transport plane.

The rollers have an outer surface, intended to enable the resting of objects to be transported. The external surfaces of the various rollers, cylindrical and having the same diameter as one another, are tangential to the transport plane.

To enable the transport of objects, the rollers are activated in rotation by means of a motor. The motor is connected to the rollers by means of a transmission that can comprise a belt, a chain, a gear train or the like.

A very common transmission system envisages the use of a belt for connecting the motor to the various rollers of the conveyor. In current devices the belt is in contact with an end portion of the rollers that is distinct from the external surface on which the objects to be transported are resting. Such end portion has a different diameter with respect to the external surface of the rollers. In the event in which the end portions of the rollers do not have the same diameter, due to a number of manufacturing errors, or in the event of eccentricity with respect to the external surface of the respective roller, the peripheral speeds of the external surfaces of the various rollers are not the same as one another. This implies an irregular transport speed of the objects, and it is also possible that the objects undergo orientation variations and unexpected and undesired rotations.

The object of the present invention is to offer a roller conveyor which enables the drawbacks summarised above to be overcome.

An advantage of the conveyor according to the present invention is that it allows the same peripheral speeds to be obtained for all the rollers, so that the transported objects advance in a regular and uniform manner, without undergoing any undesired rotations.

Further characteristics and advantages of the present invention will become more apparent in the following detailed description of an embodiment of the present invention, illustrated by way of non-limiting example in the attached figures, wherein:

FIG. 3a shows an enlargement of FIG. 3.

Figure 1:
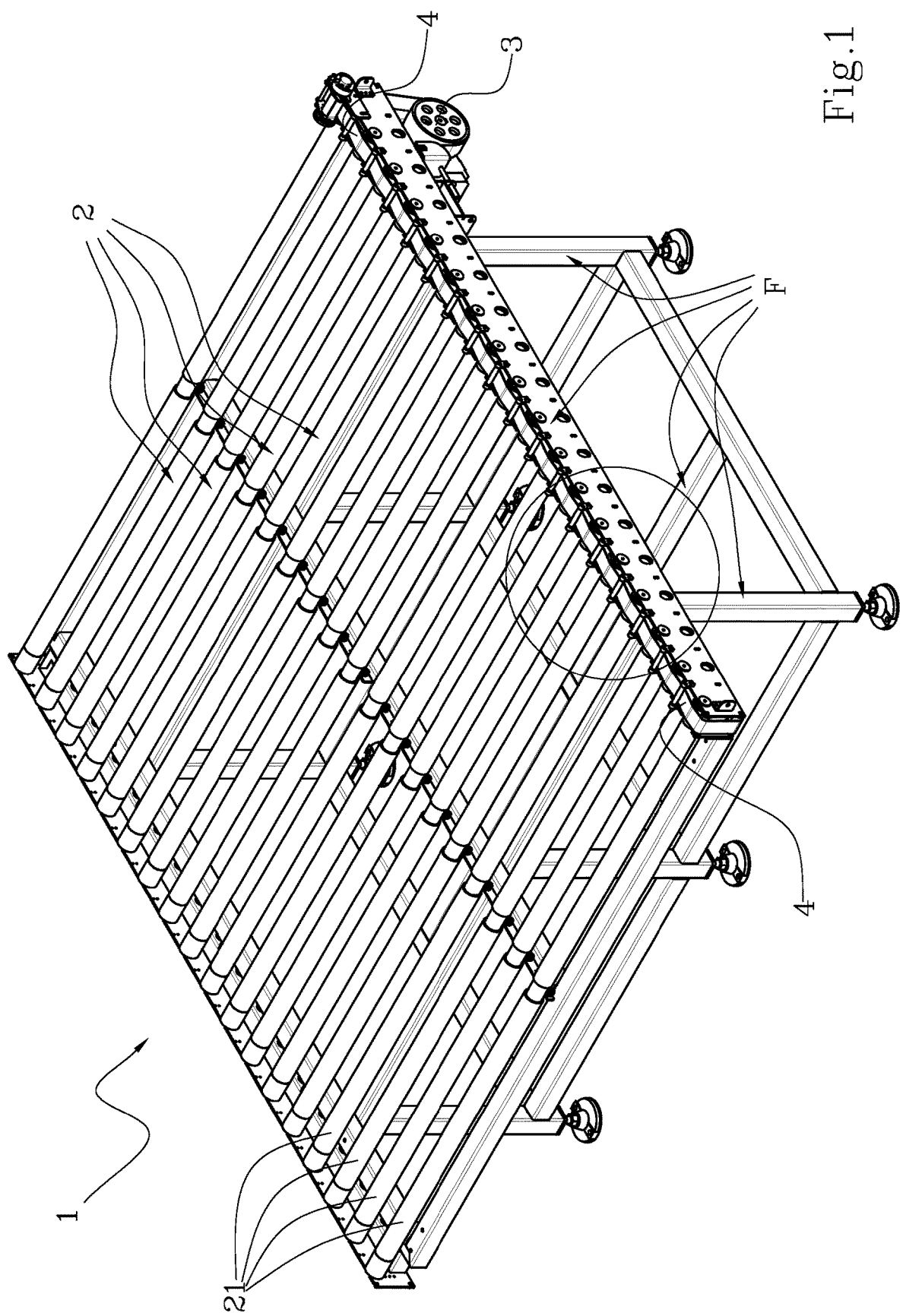
FIG. 1 shows a schematic isometric view of a conveyor according to the present invention.
Figure 1A:
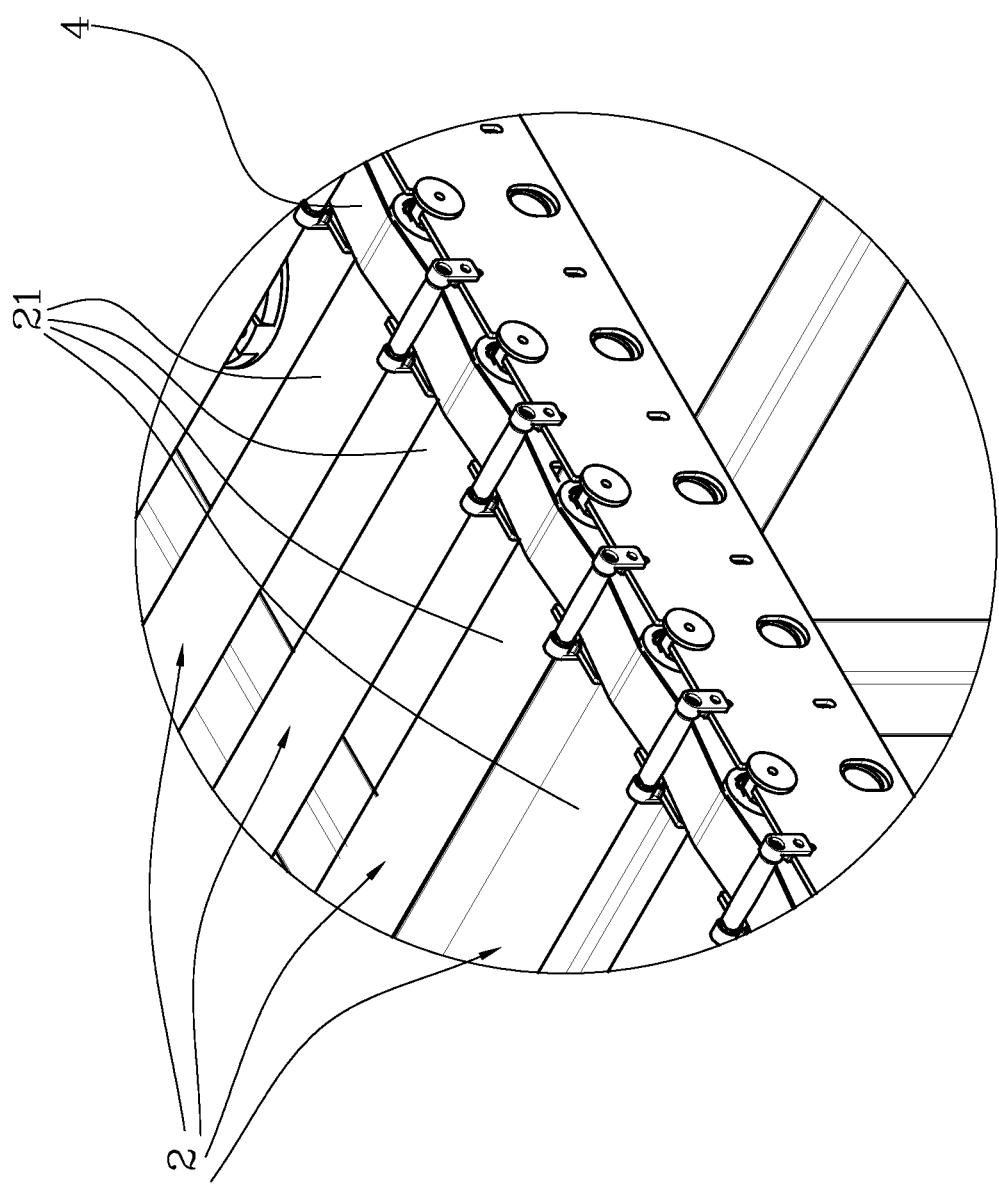
FIG. 1a shows an enlargement of FIG. 1.
Figure 2:
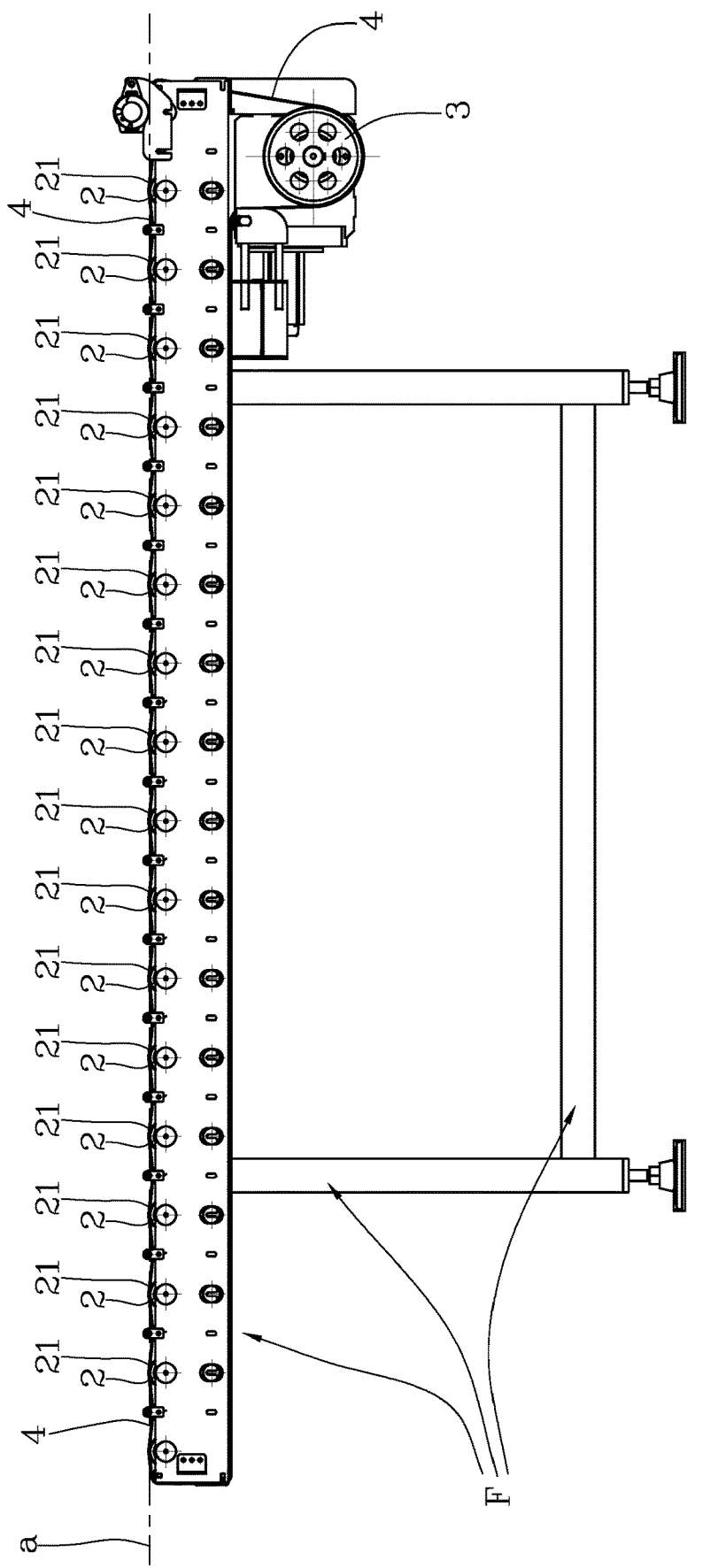
FIG. 2 shows a side view of the conveyor of FIG. 1.

The roller conveyor, according to the present invention, comprises a plurality of rollers (2) each of which has a cylindrical external surface (21), arranged to enable support of an object to be transported.

The rollers (2) are activated in rotation by means of a rotary motor (3), e.g. an electric motor. The motor (3) is connected to the rollers (2) by means of a transmission device that transfers the rotation of the motor (3) to the rollers (2). The concordant rotation of the rollers (2) determines the advancement of the objects, resting on the rollers (2) themselves, along a transport direction on the transport plane (a).

The external surfaces (21) of the rollers (2) are tangential to a transport plane (a). The transport plane (a) is preferably horizontal, but it could assume different inclinations with respect to the horizontal. The transport plane (a) is the plane on which the transport of the objects takes place, i.e. it is the plane on which the objects enter into contact with the external surfaces (21) of the rollers (2) during the advancement in the transport direction. The rollers (2) rotate about respective axes of rotation lying on a substantially parallel plane to the transport plane (a). A support frame (F) rotatably supports the rollers (2) at the ends thereof, and also enables the resting of the conveyor on the ground.

The transmission device comprises a transmission element (4), which kinematically connects the motor (3) to the rollers (2). One or more idler wheels can be interposed between the motor (3) and the rollers (2), to guide the transmission element (4) in relation to the relative position between the motor (3) and the rollers (2) and to the overall conformation of the conveyor.

The contact between the transmission element (4) and the external surface (21) takes place on a portion of the external surface (21) tangential to the transport plane (a). In other words, the transmission element (4) is placed in contact with the external surface (21) of the rollers (2), or in contact with a portion of the rollers (2) which has the same diameter as the external surface (21), tangential to the transport plane (a). In the preferred embodiment, the transmission element (4) is placed in contact with the external surface (21) of the rollers (2) so as to transfer the motion to the external surface (21) itself. This means that the external surfaces (21) of the various rollers (2) necessarily have a peripheral speed equal to the speed of the transmission element (4), and therefore have the same peripheral speed as one another. Such equal peripheral speed condition between the external surfaces (21) also occurs in the event in which the external surfaces (21) do not have exactly the same diameter, or even have a different diameter.

The solution of placing the transmission element (4) in contact with the external surface (21) of the rollers (2), or however of making the transmission element (4) interact with a portion of the rollers (2) that has the same diameter as the external surface (21), therefore allows a movement to be performed such that all the rollers (2) have the same peripheral speed at the external surface (21) tangential to the transport plane (a). This enables the objects to be transported in advancement with great precision, without producing undesired vibrations or rotations.

In the embodiment represented, which is preferred but not exclusive, the transmission element (4) comprises a flat belt. The belt (4) is a closed loop along a path that comprises a drive pulley, solidly constrained to the motor (3), one or more idler wheels and the rollers (2). In particular, a stretch of the path followed by the belt (4) is tangential to the external surfaces (21) of the rollers (2).

Preferably, but not necessarily, the conveyor comprises a plurality of tensioning rollers (5), placed in contact with the transmission element (4), on the opposite side with respect to the rollers (2). In substance, the tensioning rollers (5) are arranged so as to stretch the transmission element (4) in contact with the rollers (2) and press the transmission element (4) in contact with the external surfaces (21).

Figure 3:
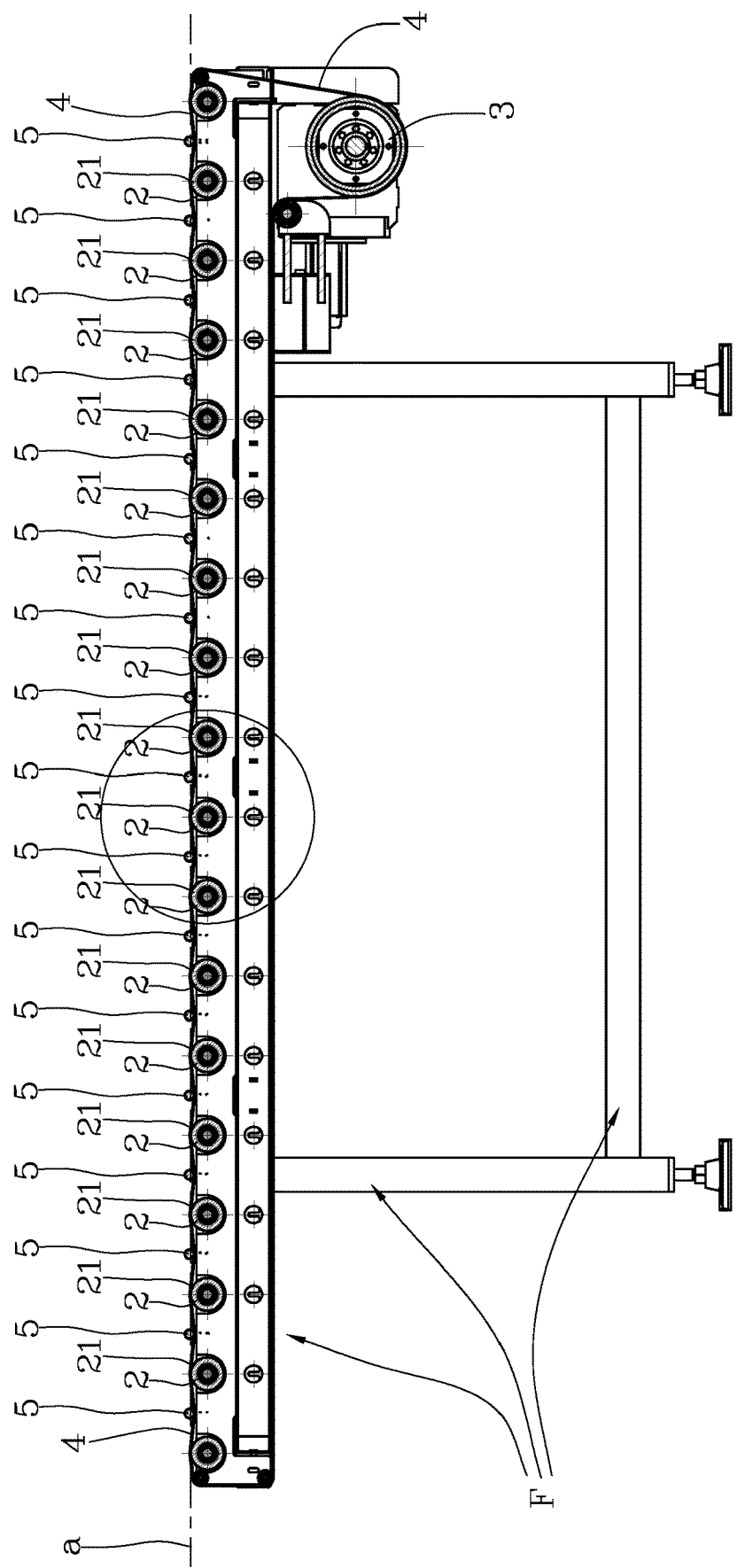
FIG. 3 shows a sectional view of the conveyor of FIG. 2.

In one of the possible embodiments, shown in FIG. 3, the tensioning rollers (5) are arranged substantially parallel to the rollers (2). The external surfaces of the tensioning rollers (5) are not tangential to the transport plane (a), but partially intersect the transport plane (a). In this way, the transmission element (4), in the form of a belt, is arranged according to an undulated path which, on one side, is tangential to the tensioning rollers (5) while, on the opposite side, it is tangential to the external surfaces (21) of the rollers (2). In another embodiment the tensioning rollers (5) may be superposed with the rollers (2) in the tangential point with the transport plane, i.e. each tensioning roller (5) may be arranged with its own axis of rotation coplanar to the axis of rotation of a respective roller (2). In substance, in this embodiment the belt is interposed between the roller (2) and the tensioning roller (5) superposed therewith.

The conveyor according to the present invention can be used in a machine for the digital printing of slabs of glass or other materials. The machine comprises an ink jet printing head, of the type known in the sector. A transport line is arranged for transporting the slabs in advancement from an inlet zone to an outlet zone, transiting below the printing head. The transport line comprises a conveyor (1) according to the present invention.

In the printing of slabs of glass, and in particular of slabs intended for the production of car windows, very high precision printing is required, for producing small writing and codes, and for the creation of opaque edge zones, designed for protecting the glue that joins the windows to the bodywork of the car from solar radiation. The use of the conveyor (1) according to the present invention guarantees very precise and uniform transport of slabs, which prevents undesired rotations of the slabs themselves. This guarantees that the slabs are presented to the printing head in a very precise and predefined position, so that the printing can be applied as envisaged for obtaining the desired graphics.

The invention claimed is:

1. A roller conveyor, comprising:
a plurality of rollers (2) which are consecutive one after the other without intermediate rollers, each of said plurality of rollers (2) having a cylindrical external surface (21), arranged to enable the resting of an object to be transported, which is tangential to a transport plane (a) on which the objects are transported;
a motor (3);
a transmission element (4), which kinematically connects the motor (3) to the rollers (2);
characterised in that, for each of said plurality of rollers (2), the transmission element (4) is placed in contact with (A) portion of the external surface (21) or (B) a portion of the roller that has the same diameter as the external surface (21), tangential to the transport plane (a);
wherein the transmission element (4) comprises a flat belt; wherein the plurality of rollers (2) comprises a first roller and a last roller; wherein the transmission element (4) follows (1) an advancement path where it advances from a beginning location adjacent the first roller and (2) a return path where it returns to the beginning location; wherein the transmission element (4), in operation, drives the last roller at an end of its advancement path and then commences its return path without driving another of said plurality of rollers (2), the last roller being driven only by the transmission element (4); wherein, when the transmission element (4) advances along the advancement path, it drives every roller with respect to which it crosses through the vertical plane defined by the rotational axis of said roller; wherein, with respect to the contacting portion of the transmission element (4) which is in contact with (A) the external surface (21) or (B) the portion of the roller that has the same diameter as the external surface (21), such contacting portion of the transmission element (4) is free from contact on its surface which is opposite its surface in contact with (A) the external surface (21) or (B) the portion of the roller that has the same diameter as the external surface (21).

2. The conveyor according to claim 1, comprising a plurality of tensioning rollers (5), placed in contact with the transmission element (4), on the opposite side of the transmission element (4) with respect to the rollers (2), so as to press the transmission element (4) into contact with the external surface (21) or the portion of the roller that has the same diameter as the external surface (21).

3. A machine for digital printing of slabs of glass or other materials, comprising a printing head and a transport line for the slabs, arranged to carry the slabs to below the printing head, characterised in that the transport line comprises a roller conveyor (1) according to claim 1.

4. A method for transporting a slab of glass or other material, comprising the following steps:
to enable support of an object to be transported;
providing a roller conveyor according to claim 1;
activating the rollers (2) in rotation by means of the motor (3) and the transmission element (4);
arranging the slab on the rollers (2);
transporting the slab on the roller conveyor.

5. The method according to claim 4, wherein the slab which is transported on the roller conveyor is a slab of glass.

* * * * *

UNITED STATES PATENT AND TRADEMARK OFFICE
CERTIFICATE OF CORRECTION

| | |
|---|---|
| PATENT NO. | : 11,325,784 B2 |
| APPLICATION NO. | : 17/284751 |
| DATED | : May 10, 2022 |
| INVENTOR(S) | : Marco Valentini |

It is certified that error appears in the above-identified patent and that said Letters Patent is hereby corrected as shown below:

In the Claims

Column 4, Line 39 (Claim 4), delete "to enable support of an object to be transported;".

Signed and Sealed this
Twenty-fifth Day of October, 2022

*Katherine Kelly Vidal*

Katherine Kelly Vidal
*Director of the United States Patent and Trademark Office*